C. WATERBURY.
RAILROAD CAR.
No. 9,084.                                  Patented June 29, 1852
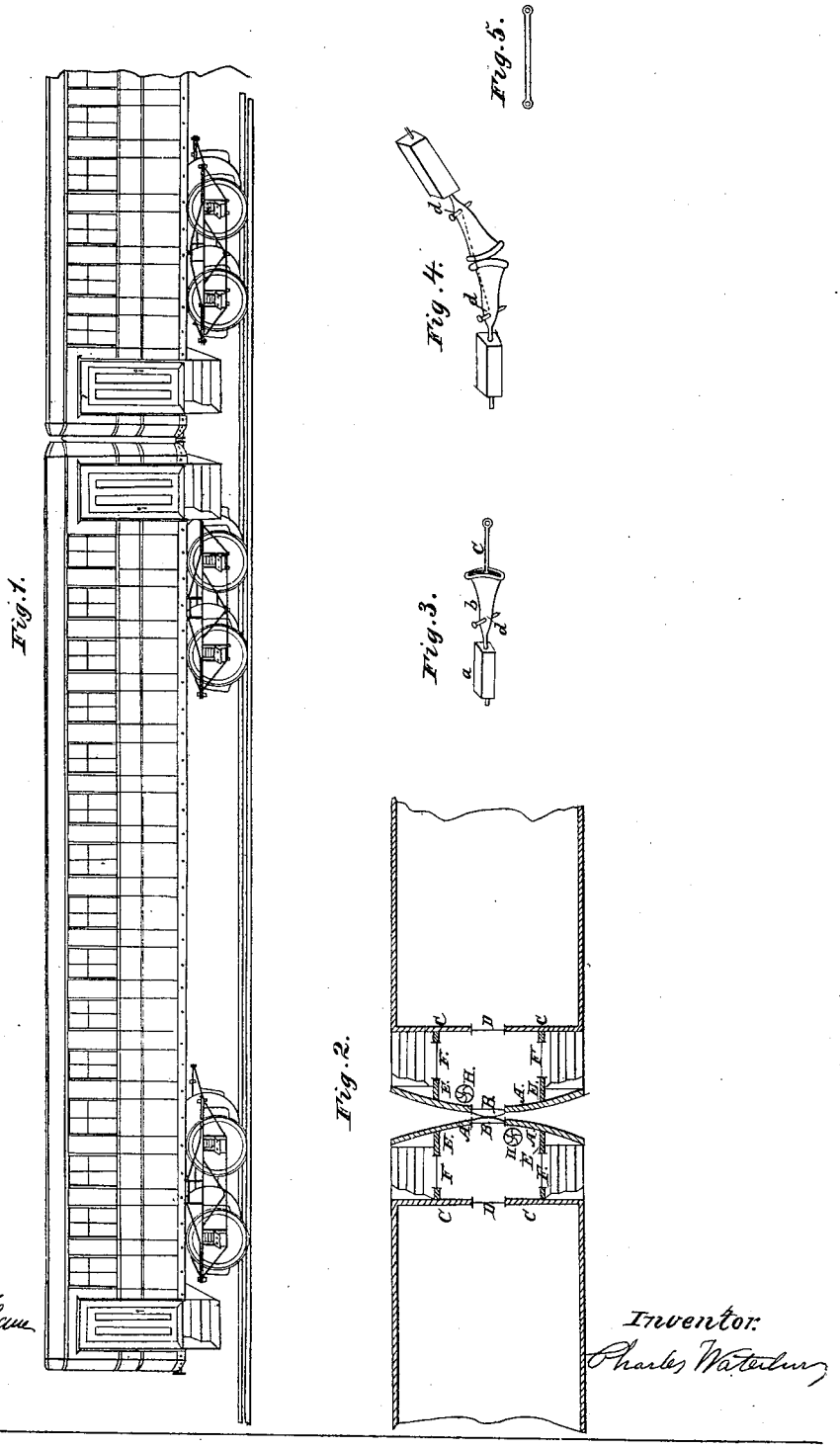

UNITED STATES PATENT OFFICE.

CHARLES WATERBURY, OF BRIDGEPORT, CONNECTICUT.

IMPROVEMENT IN RAILROAD-CARS.

Specification forming part of Letters Patent No. 9,084, dated June 29, 1852.

*To all whom it may concern:*

Be it known that I, CHARLES WATERBURY, of Bridgeport, in the county of Fairfield and State of Connecticut, have invented a new and improved mode of constructing the ends of railroad-cars for the greater security of human life and for the greater comfort and convenience of the traveling public; and I do hereby declare that the following is a full and exact description thereof, reference being had to the accompanying drawings, and to the letters of reference marked thereon.

The nature of my invention consists in constructing the ends of railroad-cars in such a manner that an inclosed communication may be had from one car to the other, so as to protect the lives of passengers while passing from one car to the other, to protect the lives of brakemen while at their post on duty, and to prevent dust from flowing into the ends of the cars, and when pure air is introduced into the forward part of the train to allow it to flow through the train through the inclosed communication.

To enable others skilled in the art to make and use my invention, I will proceed to describe its construction and operation.

First, I construct the main body of the car in any of the known forms with the usual running-gear underneath; but the end of the car is to be inclosed, as will be seen by Figure 1 of the drawings, which represents a car and a part of another when united for motion, the said inclosed end to have a door or opening in it through which a communication may be had with the next car, as will be seen on Fig. 2 of the drawings, A being the ends of the cars inclosed and B the door or opening in said end. The inclosed end referred to will prevent passengers from falling between the cars, and also will protect the brakeman while on duty, his position being at the point H.

Second, I construct partitions inside the ends of the car with doors in them on Fig. 2. E and C are the partitions, and F and D the doors in said partitions, the partitions E to extend from the end of the car A to the partition C, which runs across the car or otherwise, so that an inclosure may be made through which the cars may be ventilated or through which passengers may safely pass from one car to the other without exposure to storms.

Third, the ends of the cars to be brought near together and coupled, leaving room for the ends of the cars to act on a cushion or spring, said cushion or spring filling up, or said cushion or spring to be covered with something that will fill up or cover over the space between the ends of the floors of the cars as they come together, and the small space between the sides and top of the end doors or openings to be closed with cloth or some other substance, so that the communication or passage from one car to the other may be inclosed for the purpose of allowing air to pass through from one car to the other without losing itself, the doors D and B being open and the doors F being closed, the air being received at the forward part of the train, the only place where (in dusty times) pure air can be obtained when the cars are in motion, can pass from one car to the other, the windows being closed, and thereby furnish a new mode of ventilation, giving a plenty of pure air without any dust.

Fourth, the cars when brought near together to be coupled with a bar or link coupling in the common way, or coupled with a coupling, which, instead of being pinned outside of the end of the car, shall extend under the end and be inserted into or extend over or under a commonly-called "bumper" (shown by Fig. 3) and fastened at the point $d$, the aforesaid bumper to be made of metal or wood and larger at the mouth, where the coupling enters the bumper, as will be seen on Fig. 3, than at the point where the coupling is pinned or fastened, so that the coupling may act laterally in turning a curve and so that the end of the coupling may be easily inserted into the mouth of the bumper and be guided up to the point $d$, where the holes in the bumper will correspond with the hole in the coupling and there be fastened, said bumper to be placed under the car and fastened in the known way of fastening bumpers to cars. Said bumpers may act with or without a spring.

On Fig. 3, $a$ is the spring-box, and $b$ the bumper, and when said bumper is connected with another bumper to appear as on Fig. 4, which represents two bumpers with the coupling inside as turning a curve.

Fig. 5 represents the coupling-bar, which may be of wood or metal.

The principal idea which I would like to bring out is an inclosed communication or passage from one car to another in the train, which when formed according to the within specification will make the train of cars to be, in one sense, a tube through which air may pass from one extreme to the other without losing itself.

What I claim as my invention, and wish to secure by Letters Patent, is—

An inclosed passage or communication from one car to the other, as herein described, for the purpose of ventilating the train through the ends of the cars from the forward part of the train and for the safety of passengers while passing from one car to the other and for the purpose of keeping dust out of the cars when the train is in motion.

<div style="text-align: right;">CHARLES WATERBURY.</div>

Witnesses:
 PHILO HUNT,
 A. LANE.